Oct. 19, 1926.

J. C. OLMSTEAD 1,603,977

DEVICE FOR CUSHIONING THE INTERRELATIVE MOVEMENT OF CONNECTED BODIES

Filed March 16, 1925

INVENTOR.

Jesse C. Olmstead

BY

Cyrus W. Rice

ATTORNEY.

Witness:

G. E. Redding

Patented Oct. 19, 1926.

1,603,977

UNITED STATES PATENT OFFICE.

JESSE C. OLMSTEAD, OF CHESTER TOWNSHIP, OTTAWA COUNTY, MICHIGAN.

DEVICE FOR CUSHIONING THE INTERRELATIVE MOVEMENT OF CONNECTED BODIES.

Application filed March 16, 1925. Serial No. 15,843.

The present invention relates to devices for cushioning the interrelative movement of connected bodies, i. e. such devices as "shock-absorbers" applied to automobiles and the like; and the object is, generally, to provide a device of this character improved in various respects hereinafter appearing; and more particularly, to provide such a device comprising a cushioning element yieldingly resisting such movements in both directions.

These and other and more specific objects hereinafter appearing are attained by, and the invention finds preferable embodiment in, the device hereinafter particularly described in the body of this specification and illustrated by the accompanying drawings, in which:—

Figure 1:
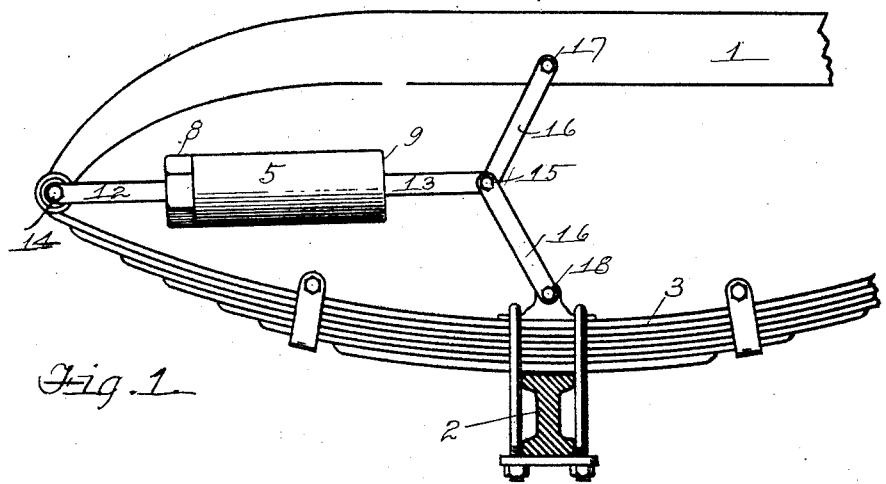
Figure 1 is a side view of a portion of the frame or chassis of an automobile and one of its supporting springs, showing my device applied thereto.

In the embodiment of the invention chosen for illustration by the drawings and for detailed description in the body of this specification, my device is shown applied to an automobile having interrelatively (i. e. vertically) movable portions—the frame or chassis 1 and the axle 2 on which is mounted the vehicle spring 3 supporting said frame. The cushioning element, the helical spring 4, is desirably enclosed in a cylindrical casing 5 having an oiling port 6 closed by a screw plug 7 and ends 8, 9 having openings 10, 11 therethrough, through which slidably pass the plungers 12 and 13 respectively. The outer end of the plunger 12 is pivotally connected to the pintle 14 connecting the ends of the chassis 1 and vehicle spring 3, and the outer end of the other plunger 13 is pivotally connected to the pintle 15 which connects the arms 16, 16 of a toggle, the other ends of said arms being pivotally mounted on the chassis 1 and the vehicle spring 3 or the axle 2, at 17 and 18 respectively.

It will be seen that in the downward movement of the chassis 1 relatively to the axle 2, caused by the automobile in its travel dropping into a rut or depression of the road, the plunger 13 is moved longitudinally, by the mutually approaching movement of the toggle arms 16, 16, toward the connection (the pintle 14) of the chassis 1 and vehicle spring 3; and that the upward movement of the chassis in the rebound of the vehicle, thus straightening the toggle arms, moves this plunger oppositely. Each of the plungers has, inside the casing, means engaging the opposite ends of the cushioning spring 4, such means carried by the plunger 12 being the lateral extensions 20, 21, of its parallel arms 22; and such means carried by the other plunger 13 being like lateral extensions 23, 24 of its parallel arms 25; these extensions 20 of plunger 12 and extensions 23 of plunger 13 engaging one end of the spring 4, and extensions 21 of plunger 12 and extensions 24 of plunger 13 engaging the opposite end of this spring. The arms 22, 25 of the plungers extend through the spring 4 axially thereof as shown, and are desirably identical in form and as to their said lateral extensions.

In the normally loaded condition of the automobile, i. e. in the position shown of the chassis 1 relatively to the axle 2, cushioning spring 4 is under only slight tension, i. e. a tension merely sufficient to maintain it taut enough to prevent looseness and consequent rattling of the parts. When however, the chassis 1 and axle 2 move interrelatively from such normal position, in either direction, the spring 4 is further and operatively tensioned increasingly, so that my device augments the action of the vehicle spring 3 in the downward movement of the chassis and resists or cushions the rebound of the vehicle in the chassis' upward movement.

Figure 2:
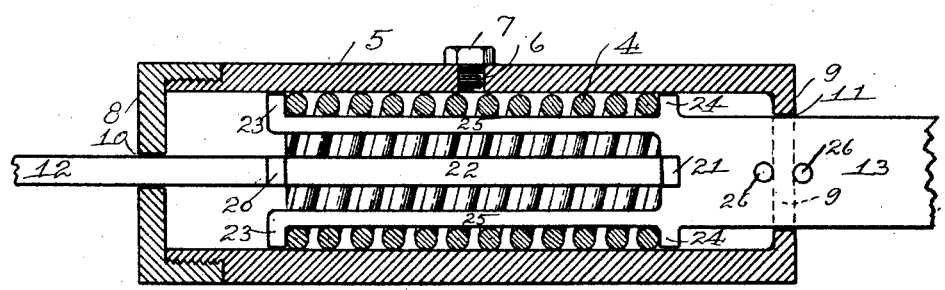
Figure 2 is an axially-sectional view of the cushioning element of my device and the casing enclosing the same, other portions of the device inside the casing being shown.
Figure 3:
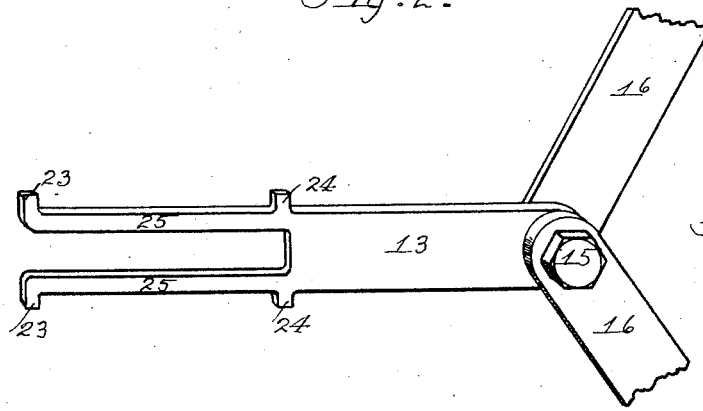
Figure 3 is a view in perspective of an actuating plunger and portions of a toggle.

It is evident that, if desired, only one of the plungers 12 or 13 may be movable, the other, as plunger 13, being held against movement relatively as to casing 5 by suitable means as by the pins 26 on the opposite sides of the casing's end 9 as indicated in Figure 2. In such construction the extensions 23, 24 of said plunger function merely as stops.

These pins are driven into the holes so tightly as to be securely held against working loose by the vibration of the automobile, or otherwise, and may be slightly upset or riveted for that purpose.

The invention being intended to be pointed out in the claims, is not to be limited to or by details of construction of the particular embodiment thereof illustrated by the drawings or hereinbefore described.

I claim:

1. In combination with interrelatively movable bodies a device of the character described comprising: a toggle whose pivotally-connected arms are pivotally mounted on said bodies respectively; a helical spring; a plunger connected to said arms and movable in the spring's axial direction by the interrelative movement of said bodies, and having means adapted to tensioningly engage one end of the spring in the plunger's movement in one direction and means adapted to tensioningly engage the other end of the spring in the plunger's opposite movement.

2. In combination with interrelatively movable bodies, a device of the character described comprising: a helical spring; plungers longitudinally movable interrelatively by the interrelative movement of said bodies and extending through the spring axially, each plunger having outwardly extending fixed portions adapted to tensionally engage one end of the spring in the plungers' interrelative movement in one direction and also having other outwardly extending fixed portions adapted to tensionally engage the other end of the spring in the plunger's opposite movement.

In testimony whereof I have hereunto set my hand at Grand Rapids, Michigan, this 12th day of March, 1925.

JESSE C. OLMSTEAD.